(12) United States Patent
Lenhert et al.

(10) Patent No.: US 10,626,994 B2
(45) Date of Patent: Apr. 21, 2020

(54) SCRAPER RING (71) Applicant: SAINT-GOBAIN PERFORMANCE PLASTICS CORPORATION, Solon, OH (US)

(72) Inventors: Jon M. Lenhert, Brea, CA (US); Oscar Bonifacio, Fullerton, CA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 149 days.

(21) Appl. No.: 15/746,883

(22) PCT Filed: Jul. 24, 2015

(86) PCT No.: PCT/US2015/042054
§ 371 (c)(1),
(2) Date: Jan. 23, 2018

(87) PCT Pub. No.: WO2017/018997
PCT Pub. Date: Feb. 2, 2017

(65) Prior Publication Data
US 2019/0309853 A1 Oct. 10, 2019

(51) Int. Cl.
*F16J 15/56* (2006.01)
*F16J 15/3236* (2016.01)
(52) U.S. Cl.
CPC ........... *F16J 15/3236* (2013.01); *F16J 15/56* (2013.01)
(58) Field of Classification Search
CPC ...... F16J 15/16; F16J 15/56; F16J 9/00; F16J 9/12; F16J 9/20
See application file for complete search history.

(56) References Cited

U.S. PATENT DOCUMENTS 3,218,087 A * 11/1965 Hallesy ............... F16J 15/3208
277/532
4,331,339 A 5/1982 Reinsma
(Continued)

FOREIGN PATENT DOCUMENTS

JP H0542758 U 6/1993
JP 2003148624 A 5/2003
(Continued)

OTHER PUBLICATIONS

Extended European Search Report for EP15899795.7 dated May 10, 2019, 6 pages.
(Continued)

*Primary Examiner* — Gilbert Y Lee
(74) *Attorney, Agent, or Firm* — Abel Schillinger, LLP; Chi Suk Kim (57) ABSTRACT A scraper ring for a linear motion assembly including an annular body having a contact face adapted to contact an inner component, wherein the annular body comprises a material having a coefficient of linear thermal expansion of at least $75 \times 10^{-6}/°$ C. An assembly for linear motion including an outer component defining a bore and a first annular recess extending radially outward from the bore; an inner component disposed in the bore, wherein the inner component is adapted to translate longitudinally within the bore; and a scraper ring disposed in the first annular recess and contacting the inner component, wherein there is no component disposed between any portion of the spacer ring and the outer component.

20 Claims, 2 Drawing Sheets

(56) References Cited

U.S. PATENT DOCUMENTS

| | | |
|---|---|---|
| 5,139,274 A | 8/1992 | Oseman |
| 5,249,813 A | 10/1993 | Botto |
| 6,367,805 B1 | 4/2002 | Radcliffe et al. |
| 6,450,502 B1 | 9/2002 | Baehl et al. |
| 6,595,524 B1 | 7/2003 | Zitting |
| 6,676,132 B1 | 1/2004 | Takebayashi et al. |
| 7,341,258 B2 * | 3/2008 | Holt ................ F16J 15/166 277/584 |
| 7,543,822 B2 | 6/2009 | Grimanis et al. |
| 8,251,373 B2 | 8/2012 | Lev et al. |
| 8,287,737 B2 | 10/2012 | Bielawski et al. |
| 2005/0098963 A1 | 5/2005 | Olsen |
| 2011/0197756 A1 | 8/2011 | Hold et al. |
| 2011/0197757 A1 | 8/2011 | Hold et al. |
| 2014/0070494 A1 | 3/2014 | Winkelmann et al. |
| 2014/0161589 A1 | 6/2014 | Janocko et al. |
| 2014/0182282 A1 * | 7/2014 | Kamen ................ F16J 15/52 60/517 |
| 2014/0377108 A1 | 12/2014 | Jones et al. |
| 2016/0131132 A1 * | 5/2016 | Stockner ............... F04B 53/143 277/436 |

FOREIGN PATENT DOCUMENTS

| | | |
|---|---|---|
| JP | 3418380 B2 | 6/2003 |
| JP | 2006226455 A | 8/2006 |
| JP | 2008514876 A | 5/2008 |
| JP | 2009287570 A | 12/2009 |
| JP | 2011163559 A | 8/2011 |
| WO | 2002016809 A2 | 2/2002 |
| WO | 2009041877 A1 | 4/2009 |
| WO | 2017018997 A1 | 2/2017 |

OTHER PUBLICATIONS

International Search Report and Written Opinion for PCT/US2015/042054, dated Apr. 15, 2016, 13 pages.

* cited by examiner

SCRAPER RING

CROSS-REFERENCE TO RELATED APPLICATIONS

This application is the National Stage of International Application No. PCT/US2015/042054, entitled "SCRAPER RING", by Jon M. LENHERT et al., filed Jul. 24, 2015, of which application is assigned to the current assignee hereof and incorporated herein by reference in its entirety.

TECHNICAL FIELD

The present disclosure relates to linear motion assemblies, and more particularly to sealed linear motion assemblies.

BACKGROUND ART

Seal assemblies are typically used to prevent leakage from occurring within an annulus between two components. A seal may be positioned between an inner component and an outer component to maintain different fluidic pressures or to separate different fluidic components on opposing sides of the seal. Under certain situations, such as upon exposure to harsh environmental conditions, like extreme cold (e.g., below −100° C.), seals and their associated components typically lose their effectiveness and fail. Industries utilizing seal assemblies continue to demand improved components which can withstand harsh environmental conditions.

BRIEF DESCRIPTION OF THE DRAWINGS

Embodiments are illustrated by way of example and are not intended to be limited in the accompanying figures.

DETAILED DESCRIPTION OF THE PREFERRED EMBODIMENT(S)

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the sealing arts.

Figure 1:
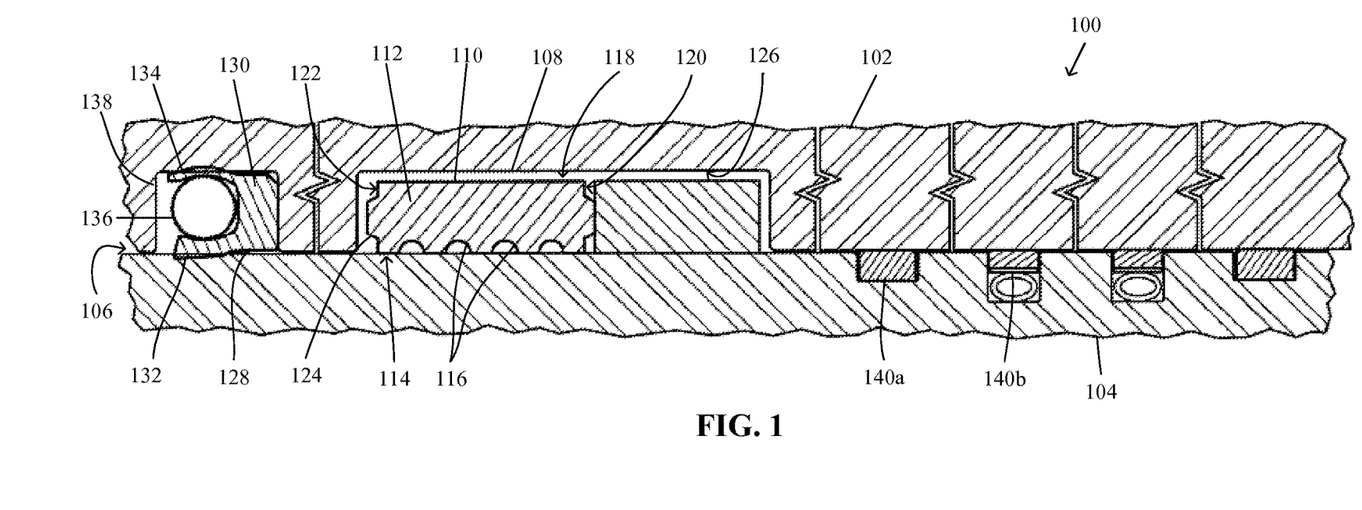
FIG. 1 includes a cross-sectional elevation view of a seal assembly in accordance with an embodiment.

Referring to FIG. 1, a linear motion assembly 100 in accordance with one or more embodiments can generally include an outer component 102, an inner component 104, and a scraper ring 110. The outer component 102 may define a bore 106 having an annular recess 108 extending radially outward from the bore 106. The annular recess 108 may have a cross-sectional profile having polygonal surfaces, arcuate surfaces, or a combination thereof. The scraper ring 110 may be disposed within the annular recess 108. In an embodiment, the scraper ring 110 may extend into the bore 106 so as to contact the inner component 104. In a particular embodiment, the scraper ring 110 may extend into the bore 106 or contact the inner component 104 only below certain temperatures (e.g., below −50° C.).

In a particular instance, the assembly 100 can include a linear actuator, such as a piston assembly. In an embodiment, the outer component 102 can include a housing for a piston. The inner component 104 may include a rod, such as a piston rod adapted to longitudinally translate within the outer component 102. One or more piston rings 140 may circumscribe the inner component 104. Some of the piston rings 140a may be unbiased by secondary features in the radial direction, while other piston rings 140b may be biased by secondary features such as energized elements. In certain embodiments, the assembly 100 may be adapted for use at temperatures of less than −100° C., less than −125° C., less than −150° C., less than −175° C., less than −200° C., or less than −225° C. In a particular embodiment, the assembly 100 is part of a piston assembly for a use with a liquid hydrogen fuel cell automotive infrastructure. The piston assembly may be used to pump or urge liquid hydrogen, for example, from one storage vessel to another or between a storage vessel and an automotive tank. The piston assembly may also be used, for example, in a liquid oxygen tank vapor recovery compressor. In other embodiments, the assembly 100 may be part of aircraft or aerospace vehicles. The assembly 100 may be used to circulate liquid hydrogen, liquid carbon dioxide, liquid nitrogen, liquid oxygen, liquid helium, liquid argon, gaseous oxygen, or any other material having cryogenic, or near cryogenic, temperatures. In a particular embodiment, translation of the inner component 104 with respect to the outer component 102 may permit compression of the liquid or gaseous material, permitting storage of the material for readily available use.

In an embodiment, the scraper ring 110 may contact the inner component 104. In a more particular embodiment, the scraper ring 110 may contact a portion of a circumference of the inner component 104. In yet a more particular embodiment, the scraper ring 110 may contact the inner component 104 around the entire circumference. In certain embodiments, the scraper ring 110 may be at least partially, such as fully, spaced apart from the inner component 104 at a first temperature and contact the inner component 104 at a second temperature. In a particular instance, the first temperature can be greater than the second temperature. For example, by way of a non-limiting example, the first temperature may be 22° C. and the second temperature may be −150° C.

In an embodiment, the scraper ring 110 may contact the outer component 102. More particularly, the scraper ring 110 may contact a radially outer surface 126 of the annular recess 108 when exposed to at least one temperature condition.

In an embodiment, the scraper ring 110 can have a thickness, as measured in a radial direction, less than a depth of the annular recess 108, as measured from a surface of the bore 106. In a particular embodiment, an outer diameter of the scraper ring 110 can be less than a diameter of the radially outer surface 126 of the annular recess 108 when exposed to at least one temperature condition. That is, an outer surface of the scraper ring 110 can be spaced apart from the radially outer surface 126 when exposed to at least one temperature.

In an embodiment, there may be no component disposed between the scraper ring 110 and the radially outer surface 126 of the annular recess 108. Traditional seal assemblies utilize secondary features such as O-rings, compression straps, spring energizers, and other similar components disposed outside of sealing elements to radially bias sealing elements toward the inner component and generate a sufficient scraping and sealing characteristics. To the contrary, in an embodiment herein the scraper ring 110 may be self-energized. That is, the scraper ring 110 can maintain effective sealing and scraping without the use of secondary features. In a particular instance, this can reduce overall manufacturing expense, prevent accidental disconnect of the secondary feature, promote easier assembly, and extend operational system lifespan.

The scraper ring 110 may include an annular body 112. In an embodiment, the annular body 112 may include a contact face 114 adapted to contact the inner component 104. In a particular instance, the contact face 114 may be generally cylindrical. As used herein, "generally cylindrical" refers to an instance where the contact face 114 occupies at least 90% of a best fit cylinder, at least 95% of a best fit cylinder, or at least 99% of a best fit cylinder. In a more particular instance, the contact face 114 may be cylindrical. In an embodiment, a groove 116 can extend into the annular body 112 from the contact face 114. The groove 116 may extend around at least a portion, or the entire, circumference of the scraper ring 110. In certain embodiments, the groove 116 may extend around the annular body 112 transverse to a central axis of the annular body 112. In other embodiments, the groove may have one or more arcuate or angled portions. In an embodiment, the groove may include a helical spiral. In an embodiment, the groove 116 may have a depth of at least 0.1 mm, at least 0.5 mm, or at least 1 mm. In another embodiment, the groove 116 may have a depth of no greater than 100 mm, no greater than 50 mm, or no greater than 10 mm.

As illustrated, the groove 116 may have a symmetrical cross section (i.e., viewed in cross section, the groove may be symmetrical about a line extending radially from the inner component 104). Use of a symmetrical groove may permit installation of the scraper ring 110 within the annular recess 108 in either rotational orientation. That is, use of a symmetrical groove can permit installation of the scraper ring 110 in either the forward or backward orientation. In certain embodiments, the groove 116 can have an arcuate cross-sectional profile. For example, as illustrated, the groove 116 can be a hemi-circle. In other embodiments, the groove 116 can have a polygonal cross-sectional profile. Exemplary polygonal cross-sectional profiles include portions of triangles, quadrilaterals, pentagons, hexagons, heptagons, octagons, nonagons, decagons, hendecagons, or dodecagons. The polygonal cross-sectional profile may also include other shapes such as stars, Greek letters, or a combination of different linear sidewall segments. In yet further embodiments, the groove 116 can have a partially arcuate, partially polygonal cross-sectional profile.

In an embodiment, the scraper ring 110 may include a plurality of grooves 116. For example, in a particular instance, the scraper ring 110 may include at least 2 grooves, at least 3 grooves, at least 4 grooves, or at least 5 grooves. In another instance, the scraper ring 110 may include no greater than 20 grooves or no greater than 10 grooves. In an embodiment, the grooves 116 may be equally spaced apart from one another. In another embodiment, the grooves 116 may have an uneven spacing configuration. In a particular instance, the grooves 116 may have similar cross-sectional profiles as one another. In another instance, at least two of the grooves 116 may have different cross-sectional profiles.

In a particular instance, the annular body 112 may have a generally rectangular cross-sectional profile. As used herein, a "generally rectangular cross-sectional profile" refers to a cross-sectional profile occupying at least 90% of a best fit rectangle, at least 95% of a best fit rectangle, or at least 99% of a best fit rectangle. In another particular instance, the annular body 112 may have a rectangular cross-sectional profile. In an embodiment, the annular body 112 may include a radially outer face 118 and first and second axial faces 120 and 122, respectively, extending from the radially outer face 118 to the contact face 114. In a particular embodiment, at least one of the first and second axial faces 120 or 122 can lie along a line that intersects the contact face 114 at a perpendicular angle. In a more particular embodiment, both the first and second axial faces 120 and 122 can lie along lines that intersect the contact face 114 at a perpendicular angle. In an embodiment, at least one of the first and second axial faces 120 and 122 can form a 90 degree angle with respect to the contact face 114 at the junction formed with the contact face 114. That is, the junction between at least one of the first and second axial faces 120 and 122 and the contact face 114 may be essentially free of a chamfer. In another embodiment, at least one of the first and second axial faces 120 and 122 can meet the contact face 114 so as to form an acute or obtuse internal angle. Use of a perpendicular or acute junction between at least one of the first and second axial faces 120 and 122 and the contact face 114 may enhance scraping performance.

In another embodiment, at least one of the first and second axial faces 120 or 122 can lie along a line that intersects the radially outer face 118 at a perpendicular angle. In an embodiment, at least one of the first and second axial faces 120 or 122 can form a 90 degree angle with respect to the radially outer face 118. That is, the junction between at least one of the first and second axial faces 120 and 122 and the contact face 114 may be essentially free, such as devoid, of a chamfer.

In an instance, the radially outer face 118 of the seal ring 110 can be planar as viewed in cross section. That is, the radially outer face 118 can be essentially free of grooves, recesses, dimples, or other features typically used in traditional seal assemblies to prevent disconnect of a secondary feature such as O-rings, compression straps, spring energizers, and other similar components used to bias sealing elements toward the inner component and generate a sufficient scraping and sealing characteristic.

In an embodiment, the annular body 112 can further include a bumper 124 disposed on at least one of the first and second axial faces 120 or 122. The bumper 124 may extend from the first or second axial face 120 or 122 a distance of at least 0.1 mm, at least 0.5 mm, at least 1 mm, at least 5 mm, or at least 10 mm. In an embodiment, the bumper 124 may extend from the first or second axial face 120 or 122 by no greater than 100 mm or no greater than 20 mm. The bumper 124 may reduce frictional resistance between the annular recess 108 and the scraper ring 110 by reducing contact area therebetween. Specifically, the bumper 124 may have a thickness, as measured in a radial direction, less than a thickness of the scraper ring 110, as measured in a radial direction. In an embodiment, the bumper 124 may extend around an entire circumference of the scraper ring 110. In another embodiment, the bumper 124 may extend around only a portion of the circumference of the scraper ring 110. In yet another embodiment, the bumper 124 may include a plurality of segments spaced apart around the circumference of the scraper ring 110. In a particular embodiment, the scraper segments may be equally spaced around the circumference of the scraper ring 110. In another particular embodiment, the scraper segments may be located at uneven intervals around the circumference of the scraper ring 110. Radially inner and outer walls of the bumper 124 may form an internal bumper angle of at least 90 degrees, at least 100 degrees, at least 110 degrees, at least 120 degrees, or at least 130 degrees.

The scraper ring 110 can have a thickness, as measured in a radial direction under ambient conditions, of at least 1 mm, at least 2 mm, at least 3 mm, at last 4 mm, at least 5 mm, or at least 10 mm. In an embodiment, the scraper ring 110 can have a thickness of no greater than 1000 mm, no greater than 100 mm, no greater than 75 mm, no greater than 50 mm, or no greater than 25 mm. In certain embodiments, the scraper ring can have a width, as measured in an axial direction under ambient conditions, of at least 1 mm, at least 5 mm, at least 10 mm, at least 25 mm, at least 50 mm, at least 75 mm, or at least 100 mm. In other embodiments, the scraper ring 110 can have a width of no greater than 1000 mm, no greater than 500 mm, no greater than 250 mm, or no greater than 150 mm. In a particular instance, the annular recess 108 can have a width, as measured in the axial direction, greater than the width of the scraper ring 110.

In traditional seal assemblies, as the temperature within the assembly is reduced (e.g., to a point of cryogenic, or near cryogenic, operation), the sealing assembly can lack sufficient radial compressive strength to maintain sufficient contact with the inner component. In this regard, the sealing assembly can have reduced sealing performance when handling cryogenic, or near cryogenic substances, such as liquid nitrogen and liquid hydrogen. In an embodiment, the scraper ring 110 may include, comprise, consist of, or consist essentially of a material having a high coefficient of linear thermal expansion (CTE). For instance, the scraper ring 110 can include a material having a CTE of at least $75 \times 10^{-6}/°$ C., at least $100 \times 10^{-6}/°$ C., at least $110 \times 10^{-6}/°$ C., at least $120 \times 10^{-6}/°$ C., at least $130 \times 10^{-6}/°$ C., at least $140 \times 10^{-6}/°$ C., at least $150 \times 10^{-6}/°$ C., at least $160 \times 10^{-6}/°$ C., at least $170 \times 10^{-6}/°$ C., at least $180 \times 10^{-6}/°$ C., at least $190 \times 10^{-6}/°$ C., or at least $200 \times 10^{-6}/°$ C. In a further embodiment, the scraper ring may include a material having a CTE of no greater than $500 \times 10^{-6}/°$ C., no greater than $400 \times 10^{-6}/°$ C., or no greater than $250 \times 10^{-}/°$ C. In this regard, the scraper ring 110 can be highly responsive to thermal environmental adjustments. Thus, as the temperature of the assembly 100 decreases, the scraper ring 110 can exhibit thermal shrinkage, causing the scraper ring 110 to generate a force against the inner component 104.

In an embodiment, the scraper ring 110 can include a material having a modulus of elasticity (MOE) of no less than 1,000 MPa, no less than 2,000 MPa, no less than 3,000 MPa, no less than 4,000 MPa, or no less than 5,000 MPa. In another embodiment, the scraper ring 110 can include a material having a MOE of no greater than 10,000.

In an embodiment, the scraper ring 110 can include a material having a specific gravity, as measured at 22.8° C. according to ASTM D792, of less than 1, less than 0.99, less than 0.98, less than 0.97, less than 0.95, or less than 0.94. In another embodiment, the scraper ring 110 can include a material having a sand wheel wear, as measured according to the Abrasion Test, of less than 500, less than 400, less than 300, less than 200, or less than 150. In yet a further embodiment, the scraper ring 110 can include a material having a Shore D durometer, as measured according to D2240, of at least 50, at least 60, at least 70, or at least 80.

In a particular instance, the scraper ring 110 can include a polymeric material, such as for example, a thermoplastic polymer. Exemplary thermoplastic polymers include Nylon, polyethylene (PE), ultra high molecular weight polyethylene (UHMWPE), high-density polyethylene (HDPE), medium-density polyethylene (MDPE), polypropylene (PP), polyvinyl chloride (PVC), polyaryletherketone (PEAK), fluoropolymers, or any combination thereof. Exemplary fluoropolymers include fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. The scraper ring 110 can have a homogenous composition in accordance with a particular embodiment.

In certain embodiments, the scraper ring 110 can include a low temperature hard coating, such as, for example, a diamond-like coating (DLC). In particular embodiments, the DLC can have a lattice structure similar to a diamond, wherein each carbon atom comprises four carbon atoms equally spaced. Alternatively, the scraper ring 110 can include a material impregnated therein by use of a high velocity oxygen fuel (HVOF) coating. HVOF coatings can extend valve life by significantly increasing the scraper ring's resistance to wear and corrosion. Moreover, HVOF coatings can affect a smoother surface finish with bond strengths in excess of 68 MPa.

In certain embodiments, the scraper ring 110 can include a material or coating such that it is inert to liquid natural gas, liquid nitrogen, liquid hydrogen, liquid helium, petrochemical residuals such as hydrogen sulfide (H2S), carbon monoxide (CO), carbon dioxide (CO2), sulfur dioxide (SO2), and trade halides. In a particular embodiment the scraper ring 110 can comprise a polyethylene such as UHMWPE. UHMWPE offers several advantages such as its resistance to degradation, superior tensile strength at, or near, cryogenic temperatures, and a minimal elongation at break. Further, the annular nature of the scraper ring 110 allows the inner diameter of the scraper ring 110 to contract upon exposure to cryogenic, or near cryogenic temperatures, thereby increasing the scraping force against the inner component 104 at low temperatures.

In an embodiment, the scraper ring 110 can have an initial inner diameter, $ID_I$, as measured at ambient conditions prior to exposure to cryogenic temperatures and prior to installation, and an effective inner diameter, $ID_E$, as measured prior to installation at −183° C., where $ID_E$ is less than $ID_I$. For example, in a particular instance, $ID_E$ may be less than 0.99 $ID_I$, less than 0.98 $ID_I$, less than 0.97 $ID_I$, less than 0.96 $ID_I$, less than 0.95 $ID_I$, less than 0.9 $ID_I$, less than 0.85 $ID_I$, or less than 0.8 $ID_I$. In another instance, $ID_E$ may be no less than 0.1 $ID_I$.

As the scraper rings 110 shrinks, it can provide a radially oriented loading force against the inner component 104. In an embodiment, the loading force, as measured at −183° C., can be no less than 1 N/cm$^2$, no less than 2 N/cm$^2$, no less than 3 N/cm$^2$, no less than 4 N/cm$^2$, no less than 5 N/cm$^2$, no less than 6 N/cm$^2$, no less than 7 N/cm$^2$, no less than 8 N/cm$^2$, no less than 9 N/cm$^2$, no less than 10 N/cm$^2$, no less than 15 N/cm$^2$, no less than 20 N/cm$^2$, no less than 30 N/cm$^2$, no less than 40 N/cm$^2$, no less than 50 N/cm$^2$, no less than 60 N/cm$^2$, no less than 70 N/cm$^2$, no less than 80 N/cm$^2$, no less than 90 N/cm$^2$, or no less than 100 N/cm$^2$. Moreover, the loading force, as measured at −183° C., can be no greater than 500 N/cm$^2$, such as no greater than 400 N/cm$^2$, no greater than 300 N/cm$^2$, no greater than 200 N/cm$^2$, no greater than 175 N/cm$^2$, no greater than 150 N/cm$^2$, no greater than 125 N/cm$^2$, or even no greater than 100 N/cm$^2$. In certain embodiments, the loading force can be uniform as measured along the contact face 114. In other embodiments, the loading force can change along the contact face 114. For example, the loading force may be highest near at least one of the axial faces 120 and 122.

In an embodiment, the scraper ring 110 can provide a loading force, as measured at room temperature (e.g., 22° C.), of no greater than 100 N/cm$^2$, no greater than 50 N/cm$^2$, no greater than 25 N/cm$^2$, no greater than 10 N/cm$^2$, no greater than 5 N/cm$^2$, no greater than 1 N/cm$^2$, no greater than 0.1 N/cm$^2$, or no greater than 0.01 N/cm$^2$. In a particular embodiment, the loading force at room temperature can be at least 0 N/cm$^2$.

In an embodiment, the assembly 100 can further include an annular seal 128 disposed in an annular recess 138. The seal 128 may include a heel 130 having fingers 132 and 134 extending from the heel 130 in parallel with respect to one another. An energizing element 136 can be disposed between and radially bias the fingers 132 and 134 apart from one another so as to provide an effective sealing characteristic. The fingers 132 and 134 are illustrated in FIG. 1 exaggerated into the inner and outer components 102 and 104 as they would appear prior to assembly. Skilled artisans will recognize after reading the entire disclosure that the fingers 132 and 134 compress in a radial direction upon assembly.

In an embodiment, the annular seal 128 may include a material that is different than the material of the scraper ring 110. In a particular embodiment, the annular seal 128 may include a polymer. The polymer can include, for example, a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. Exemplary fluoropolymers include fluorinated ethylene propylene (FEP), PTFE, polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. Fluoropolymers are used according to particular embodiments.

In a particular embodiment, the annular seal 128 can include lubrication to enhance sliding characteristics against the inner or outer components 102 or 104. Exemplary lubricants can include molybdenum disulfide, tungsten disulfide, graphite, grapheme, expanded graphite, boron nitrade, talc, calcium fluoride, or any combination thereof. Additionally, the lubricant can comprise alumina, silica, titanium dioxide, calcium fluoride, boron nitride, mica, Wollastonite, silicon carbide, silicon nitride, zirconia, carbon black, pigments, or any combination thereof.

In certain embodiments, the scraper ring 110 may be spaced apart from the annular seal 128 in an axial direction. For example, in an embodiment, the scraper ring 110 and annular seal 128 may be spaced apart by at least 0.1 cm, at least 1 cm, at least 2 cm, at least 3 cm, at least 4 cm, at least 5 cm, at least 10 cm, or at least 25 cm. In other embodiments, the scraper ring 110 and annular seal 128 may be spaced apart by no greater than 1000 cm, no greater than 500 cm, or no greater than 100 cm. Such spacing may be desirable in applications where the assembly may be exposed to a large temperature gradient. For instance, in a particular application the temperature of the assembly 100 near the annular recess 108 may be significantly colder than the temperature near the annular recess 138. While a material such as PTFE may be suitable for the annular seal 128, it may be desirable for the scraper ring 110 to include a different material such as UHMWPE in view of the low temperature operating conditions at the annular recess 108. Upon exposure to these low temperature operating conditions, the scraper ring 110 may effectively scrape contaminant from the inner component 104, preventing the contaminant from reaching the urged liquid.

In certain instances, the annular seal 128 may have a maximum thickness, as measured in a radial direction prior to installation in the assembly, greater than the thickness of the scraper ring 110. This may allow the annular seal 128 to protect against ingress of loose contaminant while the scraper removes contaminant frozen or adhered to the inner component 102.

In certain embodiments, the assembly 100 may further include an annular spacer 142 disposed at an axial end 120 or 122 of the scraper ring 110. The annular spacer 142 may be disposed in the annular recess 108. In an embodiment, the annular spacer 142 may abut the axial end 120 or 122 of the scraper ring 110. In another embodiment, the annular spacer can have a thickness, as measured in a radial direction prior to installation, that is no less than the thickness of the scraper ring 110. In a further embodiment, the annular spacer 142 may include a material different than the material of the scraper ring 110. For example, the annular spacer 142 may include a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. Exemplary fluoropolymers include fluorinated ethylene propylene (FEP), PTFE, polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. Fluoropolymers are used according to particular embodiments.

Installation of the scraper ring 110 in the assembly 100 may be performed prior to installation of the inner component 102 within the bore 106. The scraper ring 110 may be deformed, e.g., by compressive force, and urged into the bore 106 at an angle until it achieves contact with the annular recess 108. The scraper ring 110 may then be pivoted into position within the annular recess 108. In certain embodiments, undersizing the scraper ring 110 relative to the annular recess 108 may permit easier installation by allowing a user to over-install, pivot, and arrange the entire scraper ring 110 into the annular recess 108. After installation, the inner component 102 may be translated into position within the bore 106. Traditional assemblies utilizing overlapping (or partially overlapping) components may be relatively more difficult to install as the components may deform at different rates, the components may occupy a greater volume making it more difficult to pivot to final orientation, and the components may slip relative to one another, requiring removal of the assembly for correction. Moreover, it is often impossible to see whether the components are aligned once in the annular recess as the innermost component typically blocks a user's view of the outer components.

Figure 2:
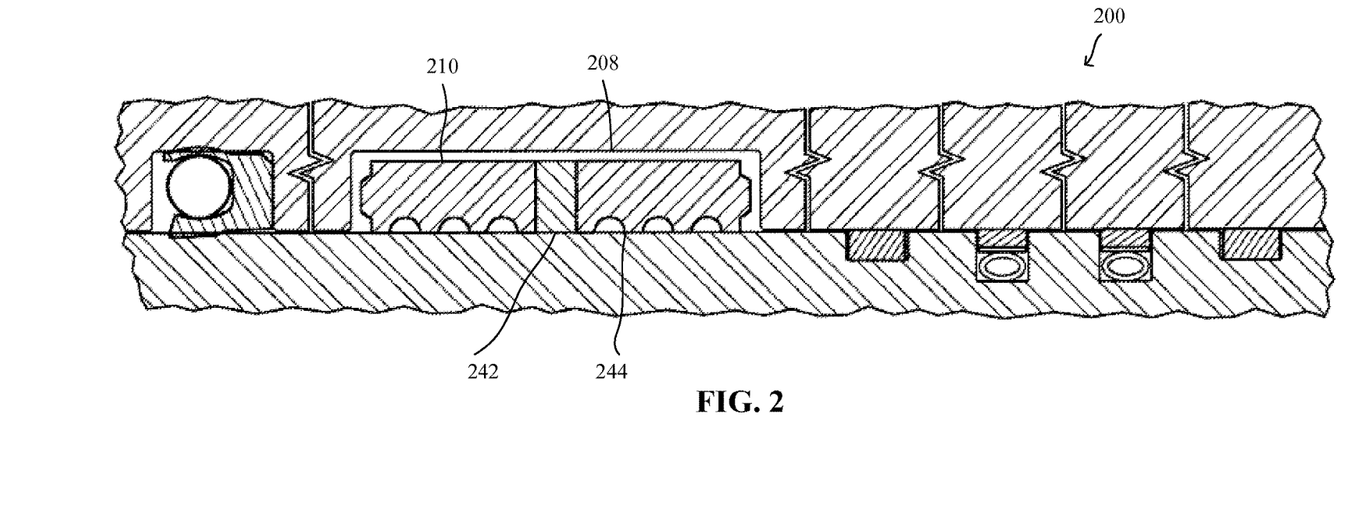
FIG. 2 includes a cross-sectional elevation view of a seal assembly in accordance with another embodiment.

Referring to FIG. 2, in other embodiments, an assembly 200 may include a secondary scraper ring 244 disposed in an annular recess 208. The secondary scraper ring 244 may have any number of similar attributes or characteristics as described above with respect to the scraper ring 110. In a particular instance, an annular spacer 242 may be disposed between the scraper ring 210 and the secondary scraper ring 244. The scraper ring 210, annular spacer 242, and secondary scraper ring 244 may float with respect to one another within the annular recess 208. That is, the scraper ring 210, annular spacer 242, and secondary scraper ring 244 may be disconnected from one another and move relative to one another. The annular spacer 242 may enhance relative sliding of the scraper ring 210 or secondary scraper ring 244 with respect to one another, thus permitting relative rotational movement therebetween.

In a particular embodiment, the second scraper ring 244, annular spacer 242, and scraper ring 210 may be installed individually, permitting maximum installation space and making it easier to reach final assembly. In other embodiments, the second scraper ring 244, annular spacer 242, and scraper ring 210 may be installed as a single unit, i.e., they may be installed together at a single time.

Figure 3:
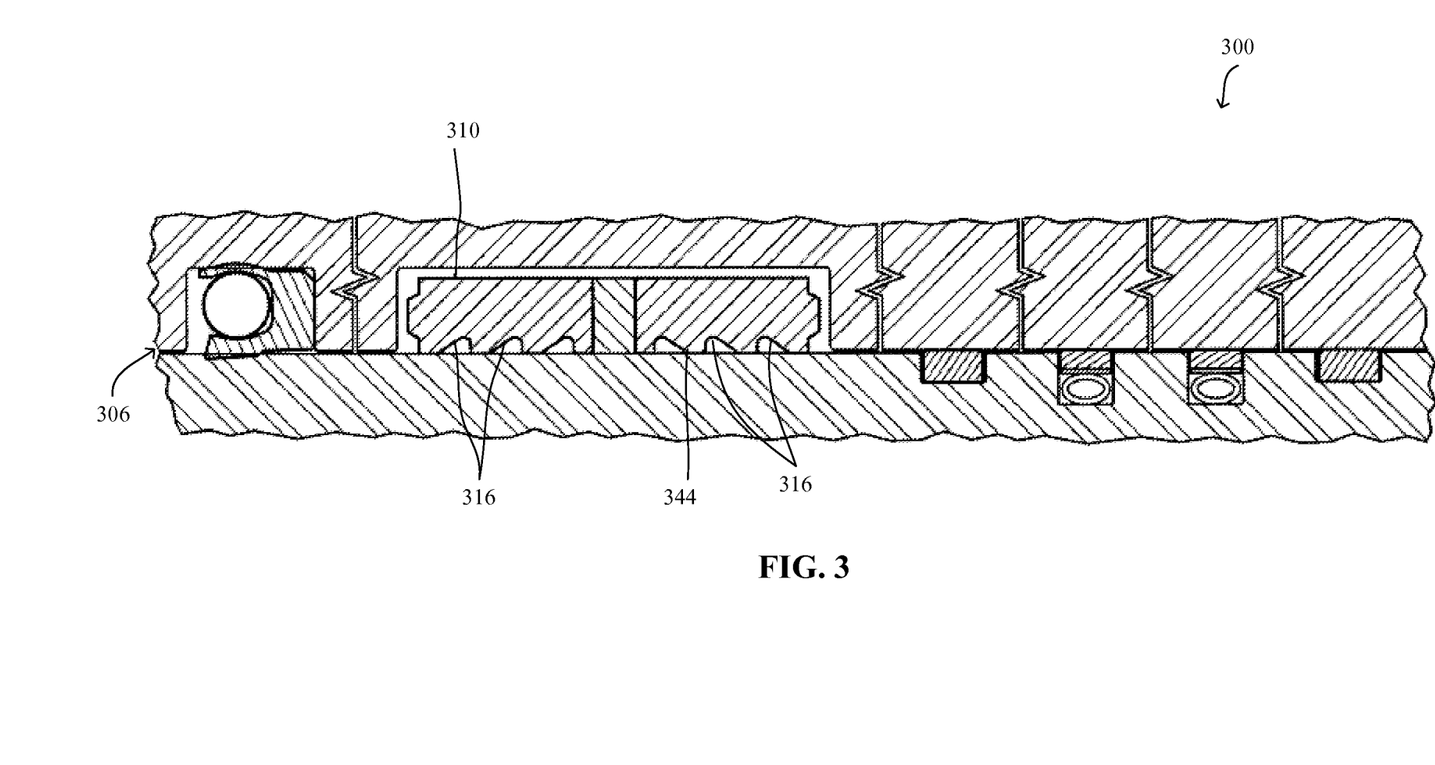
FIG. 3 includes a cross-sectional elevation view of a seal assembly in accordance with another embodiment.

Referring to FIG. 3, in an embodiment, an assembly 300 can include a scraper ring 310 having grooves 316 with asymmetrical cross-sectional profiles. The scraper ring 310 may have any number of similar attributes or characteristics as described above with respect to the scraper ring 110 or 210. In an embodiment, asymmetrical grooves 316 may enhance fluid pumping, expelling potential contaminants before passing along the bore 306. A secondary scraper ring 344 may have grooves 316 oriented in reverse to permit enhanced bi-directional scraping and pumping action.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A scraper ring for a linear motion assembly comprising:
an annular body having a contact face adapted to contact an inner component,
wherein the annular body comprises a material having a coefficient of linear thermal expansion of at least $75 \times 10^{-6}/° C$.

Item 2. An assembly for linear motion comprising:
an outer component defining a bore and a first annular recess extending radially outward from the bore;
an inner component disposed in the bore, wherein the inner component is adapted to translate longitudinally within the bore; and
a scraper ring disposed in the first annular recess and contacting the inner component, wherein the scraper ring comprises ultra high molecular weight polyethylene.

Item 3. An assembly for linear motion comprising:
an outer component defining a bore and a first annular recess extending radially outward from the bore;
an inner component disposed in the bore, wherein the inner component is adapted to translate longitudinally within the bore; and
a scraper ring disposed in the first annular recess and contacting the inner component, wherein there is no component disposed between any portion of the spacer ring and a radially outermost surface of the outer component.

Item 4. The scraper ring or assembly of any one of items 1 and 3, wherein the scraper ring comprises an ultra high molecular weight polyethylene.

Item 5. The assembly of any one of items 2-4, wherein the scraper ring is adapted to provide a loading force against the inner component, as measured at $-183°$ C., of no less than 1 N/cm$^2$, no less than 2 N/cm$^2$, no less than 3 N/cm$^2$, no less than 4 N/cm$^2$, no less than 5 N/cm$^2$, no less than 6 N/cm$^2$, no less than 7 N/cm$^2$, no less than 8 N/cm$^2$, no less than 9 N/cm$^2$, no less than 10 N/cm$^2$, no less than 15 N/cm$^2$, no less than 20 N/cm$^2$, no less than 30 N/cm$^2$, no less than 40 N/cm$^2$, no less than 50 N/cm$^2$, no less than 60 N/cm$^2$, no less than 70 N/cm$^2$, no less than 80 N/cm$^2$, no less than 90 N/cm$^2$, or no less than 100 N/cm$^2$, wherein the scraper ring is adapted to provide a loading force against the inner component, as measured at $-183°$ C., of no greater than 500 N/cm$^2$, such as no greater than 400 N/cm$^2$, no greater than 300 N/cm$^2$, no greater than 200 N/cm$^2$, no greater than 175 N/cm$^2$, no greater than 150 N/cm$^2$, no greater than 125 N/cm$^2$, or even no greater than 100 N/cm$^2$ Item 6. The assembly of any one of items 2-5, wherein the first annular recess comprises a radially outer surface, and wherein the scraper ring is adapted to contact the radially outer surface of the first annular recess and a surface of the inner component when exposed to at least one temperature, wherein the scraper ring has a thickness that is less than a depth of the first annular recess.

Item 7. The assembly of any one of items 2-6, wherein the assembly further comprises:
an annular seal comprising:
a heel and a first and a second fingers extending from the heel; and
an energizing element disposed between the first and second fingers.

Item 8. The assembly of item 7, wherein the scraper ring is spaced apart from the annular seal in an axial direction, wherein the scraper ring is spaced apart from the annular seal by at least 0.1 cm, at least 1 cm, at least 2 cm, at least 3 cm, at least 4 cm, at least 5 cm, at least 10 cm, or at least 25 cm, wherein the scraper ring is spaced apart from the annular seal by no greater than 1000 cm, no greater than 500 cm, or no greater than 100 cm.

Item 9. The assembly of any one of items 7 and 8, wherein the annular seal comprises a different material than the scraper ring, wherein the annular seal comprises a fluoropolymer, wherein the annular seal comprises a PTFE, wherein the annular seal comprises a filler.

Item 10. The assembly of any one of items 7-9, wherein the annular seal is disposed within a second annular recess extending radially outward from the bore.

Item 11. The assembly of any one of items 7-10, wherein the annular seal has a maximum thickness, as measured in a radial direction prior to installation in the assembly, wherein the scraper ring has a thickness, as measured in a radial direction prior to installation in the assembly, and wherein the maximum thickness of the annular seal is greater than the thickness of the scraper ring.

Item 12. The assembly of any one of items 2-11, further comprising:
an annular spacer disposed at an axial end of the scraper ring.

Item 13. The assembly of item 12, wherein the annular spacer is disposed within the annular recess, wherein the annular spacer abuts the axial end of the scraper ring, wherein the annular spacer has a thickness, as measured in a radial direction prior to installation in the assembly, that is no less than a thickness of the scraper ring, as measured in a radial direction prior to installation in the assembly, wherein the annular spacer comprises a different material than the scraper ring, wherein the annular spacer comprises a fluoropolymer, wherein the annular spacer comprises a PTFE.

Item 14. The assembly of any one of items 12-13, further comprising a secondary scraper ring, wherein the annular spacer is disposed between the scraper ring and the secondary scraper ring.

Item 15. The scraper ring or assembly of any one of the preceding items, wherein the linear motion assembly comprises a piston assembly.

Item 16. The scraper ring or assembly of any one of the preceding items, wherein the linear motion assembly is adapted to operate at temperatures of less than −100° C., less than −125° C., less than −150° C., less than −175° C., less than −200° C., or less than −225° C.

Item 17. The scraper ring or assembly of any one of the preceding items, wherein the scraper ring has a thickness, as measured in a radial direction at ambient conditions, of at least 1 mm, at least 2 mm, at least 3 mm, at least 4 mm, at least 5 mm, or at least 10 mm, wherein the scraper ring has a thickness of no greater than 100 mm, no greater than 75 mm, no greater than 50 mm, or no greater than 25 mm.

Item 18.The scraper ring or assembly of any one of the preceding items, wherein the scraper ring has a width, as measured in an axial direction at ambient conditions, of at least 1 mm, at least 5 mm, at least 10 mm, at least 25 mm, at least 50 mm, at least 75 mm, or at least 100 mm, wherein the scraper ring has a width of no greater than 1000 mm, no greater than 500 mm, no greater than 250 mm, or no greater than 150 mm.

Item 19. The scraper ring or assembly of any one of the preceding items, wherein the scraper ring has an initial inner diameter, $ID_I$, as measured uninstalled at ambient conditions, and an effective inner diameter, $ID_E$, as measured uninstalled at −183° C. , and wherein $ID_E$ is less than $ID_I$, wherein $ID_E$ is less than 0.99 $ID_I$, less than 0.98 $ID_I$, less than 0.97 $ID_I$, less than 0.96 $ID_I$, less than 0.95 $ID_I$, less than 0.9 $ID_I$, less than 0.85 $ID_I$, or less than 0.8 $ID_I$.

Item 20. The scraper ring or assembly of any one of the preceding items, wherein the scraper ring comprises an annular body having a generally rectangular cross-sectional profile, wherein the scraper ring comprises an annular body having a rectangular cross-sectional profile.

Item 21. The scraper ring or assembly of any one of the preceding items, wherein the scraper ring comprises an annular body having a contact face adapted to contact the inner component, a radially outer face opposite the contact face, and a first and second axial faces.

Item 22. The scraper ring or assembly of item 21, wherein the annular body of the scraper ring further comprises a bumper disposed on at least one of the first and second axial faces, wherein the bumper extends along the at least one of the first and second faces a distance less than a thickness of the scraper ring.

Item 23. The scraper ring or assembly of any one of items 21 and 22, wherein the scraper ring further defines a groove extending radially outward from the contact face.

Item 24. The scraper ring or assembly of any one of items 1 and 23, wherein the groove comprises at least 2 grooves, at least 3 grooves, at least 4 grooves, or at least 5 grooves, wherein the groove comprises no greater than 20 grooves, or no greater than 10 grooves.

Item 25. The scraper ring or assembly of any one of items 1, 23, and 24, wherein the groove is symmetrical as viewed in cross section.

Item 26. The scraper ring or assembly of any one of items 1 and 23-25, wherein the groove is asymmetrical as viewed in cross section, wherein the groove is adapted to prevent ingress of a contaminant into the assembly, wherein the groove is adapted to pump a contaminant out of the assembly when the seal ring is translated in an axial direction.

Item 27. The scraper ring or assembly of any one of items 1, 2, and 4-26, wherein the scraper ring is disposed such that there is no component between any portion of the scraper ring and an outer component.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range, including the end range values referenced. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

The invention claimed is:

1. A scraper ring for a linear motion assembly comprising: an annular body having a contact face adapted to contact an inner component,
wherein the annular body comprises a material having a coefficient of linear thermal expansion of at least $75 \times 10^{-6}/°$ C., wherein the annular body comprises a first axial face and a second axial face, and wherein the annular body comprises a bumper extending from at least one of the first axial face and the second axial face.

2. The scraper ring of claim 1, wherein the scraper ring comprises an ultra high molecular weight polyethylene.

3. The scraper ring of claim 1, wherein the scraper ring has an initial inner diameter, $ID_I$, as measured in an uninstalled state at ambient conditions, and an effective inner diameter, $ID_E$, as measured in an uninstalled state at $-183°$ C., and wherein $ID_E$ is less than $ID_I$.

4. The scraper ring of claim 1, wherein the scraper ring has a thickness, as measured in a radial direction at ambient conditions, of at least 1 mm and no greater than 100 mm.

5. The scraper ring of claim 1, wherein the scraper ring has a width, as measured in an axial direction at ambient conditions, of at least 1 mm and no greater than 1000 mm.

6. The scraper ring of claim 1, wherein the annular body has a generally rectangular cross-sectional profile.

7. An assembly for linear motion comprising:
an outer component defining a bore and a first annular recess extending radially outward from the bore;
an inner component disposed in the bore, wherein the inner component is adapted to translate longitudinally within the bore; and
a scraper ring disposed in the first annular recess and contacting the inner component, wherein the scraper ring comprises ultra high molecular weight polyethylene, wherein the scraper ring comprises an annular body comprising a first axial face and a second axial face, and wherein the annular body comprises a bumper extending from at least one of the first axial face and the second axial face.

8. The assembly of claim 7, wherein the assembly further comprises:
an annular seal comprising:
a heel and a first and a second fingers extending from the heel; and
an energizing element disposed between the first and second fingers.

9. The assembly of claim 8, wherein the scraper ring is spaced apart from the annular seal in an axial direction by at least 5 cm.

10. The assembly of claim 8, wherein the annular seal comprises a different material than the scraper ring.

11. The assembly of any one of claim 8, wherein the annular seal has a maximum thickness, as measured in a radial direction prior to installation in the assembly, wherein the scraper ring has a thickness, as measured in a radial direction prior to installation in the assembly, and wherein the maximum thickness of the annular seal is greater than the thickness of the scraper ring.

12. The assembly of claim 8, wherein the annular seal has a maximum thickness, as measured in a radial direction prior to installation in the assembly, wherein the scraper ring has a thickness, as measured in a radial direction prior to installation in the assembly, and wherein the maximum thickness of the annular seal is greater than the thickness of the scraper ring.

13. The assembly of claim 7, further comprising:
an annular spacer disposed at an axial end of the scraper ring.

14. The assembly of claim 13, wherein the annular spacer abuts the axial end of the scraper ring, and wherein the annular spacer comprises a different material than the scraper ring.

15. The assembly of claim 13, further comprising a secondary scraper ring, wherein the annular spacer is disposed between the scraper ring and the secondary scraper ring.

16. The assembly of claim 7, wherein the scraper ring is adapted to provide a loading force against the inner component, as measured at $-183°$ C., of no less than 1 N/cm$^2$, and no greater than 500 N/cm$^2$.

17. The assembly of claim 7, wherein the first annular recess comprises a radially outer surface, and wherein the scraper ring is adapted to contact the radially outer surface of the first annular recess and a surface of the inner component when exposed to at least one temperature, and wherein the scraper ring has a thickness that is less than a depth of the first annular recess.

18. The assembly of claim 7, wherein the scraper ring comprises an annular body having a contact face adapted to contact the inner component, a radially outer face opposite the contact face.

19. The assembly of claim 18, wherein the bumper extends along the at least one of the first and second faces a distance less than a thickness of the scraper ring.

20. An assembly for linear motion comprising:
an outer component defining a bore and a first annular recess extending radially outward from the bore;
an inner component disposed in the bore, wherein the inner component is adapted to translate longitudinally within the bore; and
a scraper ring disposed in the first annular recess and contacting the inner component, wherein there is no component disposed between any portion of the spacer ring and a radially outermost surface of the first annular recess, wherein the scraper ring comprises an annular body comprising a first axial face and a second axial face, and wherein the annular body comprises a bumper extending from at least one of the first axial face and the second axial face.

* * * * *

UNITED STATES PATENT AND TRADEMARK OFFICE
CERTIFICATE OF CORRECTION

PATENT NO. : 10,626,994 B2
APPLICATION NO. : 15/746883
DATED : April 21, 2020
INVENTOR(S) : Jon M. Lenhert et al.

It is certified that error appears in the above-identified patent and that said Letters Patent is hereby corrected as shown below:

In the Specification

Column 6, Line 2, please delete "$250 \times 10^{-/\circ}$ C.", and insert --$250 \times 10^{-6} /^\circ$ C.--

Signed and Sealed this
Seventh Day of June, 2022

Katherine Kelly Vidal
*Director of the United States Patent and Trademark Office*